US009455964B2

(12) United States Patent
Mower

(10) Patent No.: US 9,455,964 B2
(45) Date of Patent: Sep. 27, 2016

(54) GUEST WIFI AUTHENTICATION BASED ON PHYSICAL PROXIMITY

(71) Applicant: Aruba Networks, Inc., Sunnyvale, CA (US)

(72) Inventor: Carl Mower, Sunnyvale, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/611,158

(22) Filed: Jan. 30, 2015

(65) Prior Publication Data

US 2016/0226842 A1 Aug. 4, 2016

(51) Int. Cl.
*H04L 29/06* (2006.01)
*H04W 12/06* (2009.01)
*H04W 84/12* (2009.01)

(52) U.S. Cl.
CPC .......... *H04L 63/0492* (2013.01); *H04W 12/06* (2013.01); *H04W 84/12* (2013.01)

(58) Field of Classification Search
CPC ......... H04L 63/0492; H04L 2209/80; H04W 12/06; H04W 84/12; H04W 76/02; G06F 21/35
USPC ............................................................ 726/4
See application file for complete search history.

(56) References Cited

U.S. PATENT DOCUMENTS

| 2013/0152168 | A1* | 6/2013 | Nasir | H04W 12/08 726/4 |
| 2014/0050208 | A1* | 2/2014 | Annaluru | H04W 84/12 370/338 |
| 2014/0127994 | A1* | 5/2014 | Nightingale | H04W 4/008 455/41.1 |

* cited by examiner

*Primary Examiner* — Yogesh Paliwal
(74) *Attorney, Agent, or Firm* — Hewlett Packard Enterprise Patent Department

(57) ABSTRACT

The present disclosure discloses a system and method for providing guest WiFi authentication based on physical proximity to a dedicated access point in a guest wireless network. Specifically, a network device determines that a client device associated with a guest user is located within close physical proximity to a particular access point in a guest wireless network, and authenticates the client device for guest wireless network access based on its close physical proximity to the particular access point without requiring any guest user registration. In particular, the network device determines a first signal strength level of a wireless signal received from the client device by the particular access point, and determines that the first signal strength level exceeds a threshold. The threshold is based on difference between signal strength levels of the wireless signal received at the client device and at a distance corresponding to the close physical proximity.

17 Claims, 4 Drawing Sheets

GUEST WIFI AUTHENTICATION BASED ON PHYSICAL PROXIMITY

FIELD

Embodiments of the present disclosure relate to network authentications. In particular, embodiments of the present disclosure describe a system and a method for providing guest WiFi authentications based on physical proximity of the client device to a dedicated access point in a wireless network.

BACKGROUND

Typically, when a guest user tries to get access to a corporate guest WiFi network, the guest user is required to complete a registration process. For example, the guest user may be required to provide name and email address via a kiosk or to a receptionist at a corporate office. As another example, a guest user of wireless network at an airport or a hotel may need to access a captive portal to answer a few questions before being granted guest wireless network access. Sometimes, the guest user is also required to answer a few questions in addition to personal information. The requirement of such guest registration process to gain wireless network access for a guest user can become an annoyance. The purpose of the guest registration process usually is not to gather useful data information, but rather to separate legitimate corporate guest from free riders that are physically located nearby within the wireless network coverage area.

DETAILED DESCRIPTION

In the following description, several specific details are presented to provide a thorough understanding. While the context of the disclosure is directed to network authentications, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

BRIEF DESCRIPTION OF THE DRAWINGS

The present disclosure may be best understood by referring to the following description and accompanying drawings that are used to illustrate embodiments of the present disclosure.

OVERVIEW

Embodiments of the present disclosure relate to network authentications. In particular, embodiments of the present disclosure describe a system and a method for providing guest WiFi authentications based on physical proximity of the client device to a dedicated access point in a wireless network.

With the solution provided herein, a network device determines that a client device associated with a guest user is located within close physical proximity to a particular access point in a guest wireless network, and authenticates the client device for guest wireless network access based on its close physical proximity to the particular access point without requiring any guest user registration.

In particular, the network device determines a first signal strength level of a wireless signal received from the client device by the particular access point, and determines that the first signal strength level exceeds a threshold. The threshold is based on difference between signal strength levels of the wireless signal received at the client device and at a distance corresponding to the close physical proximity.

The disclosed technique eliminates the need for any form of registration either by a guest user or by a corporate sponsor, and eliminates the need to deliver any credentials back to the guest user. Furthermore, the disclosed technique eliminates the need for a guest-access sponsor, because the need for the guest-access sponsor is substituted by the fact that the guest user has achieved the physical proximity to the dedicated access point. Also, the disclosed technique eliminates the need for an out-of-band delivery mechanism to get guest-access credentials to a user that lacks WiFi access, for example, via a badge printer or a Short Message Service (SMS) to a cellular device.

Networking Environment

Figure 1:
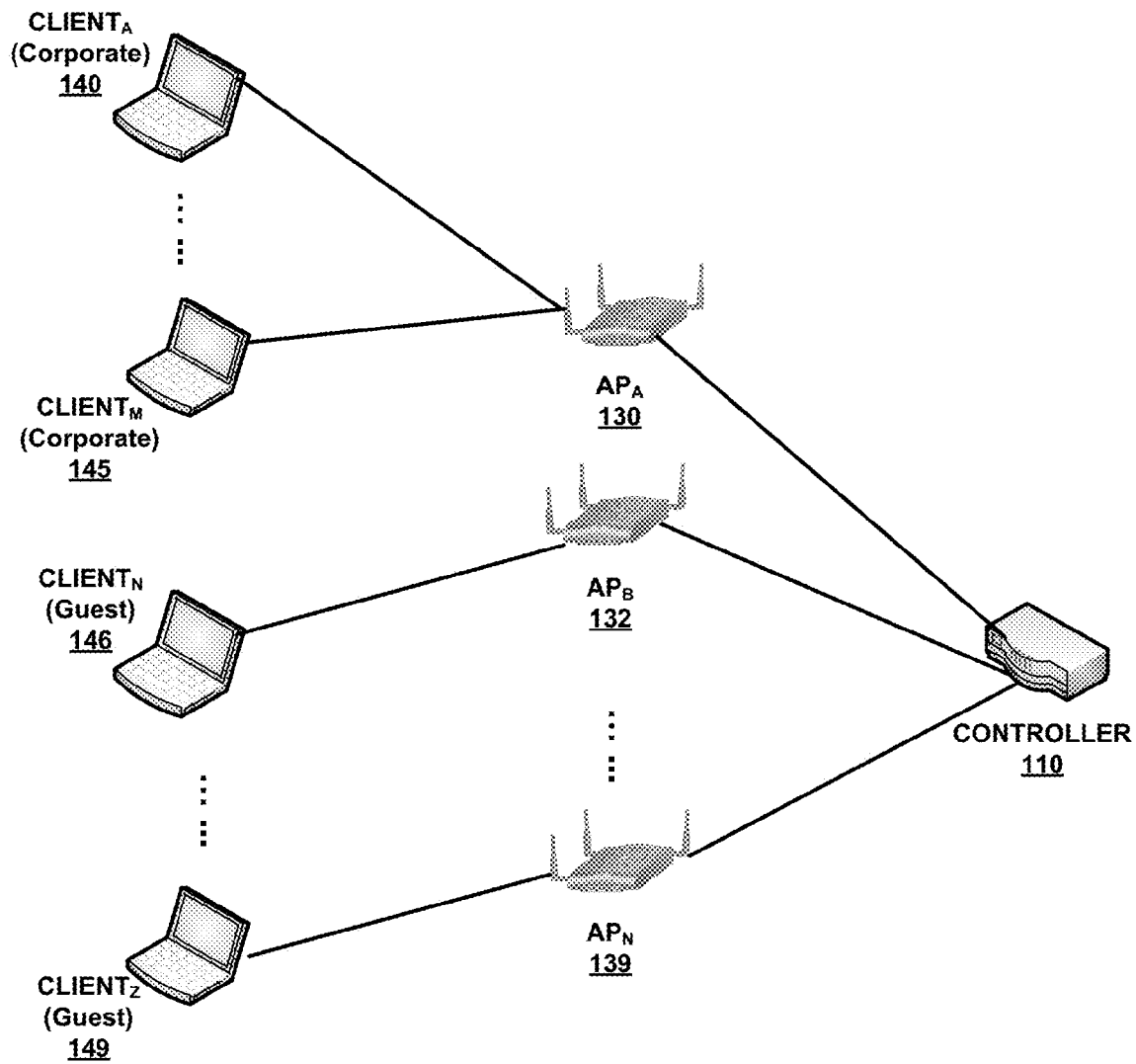
FIG. 1 shows an exemplary network environment according to embodiments of the present disclosure.

FIG. 1 shows an exemplary network environment according to embodiments of the present disclosure. The network environment as illustrated in FIG. 1 includes at least a controller 110, a number of APs, such as $AP_A$ 130, $AP_B$ 132, ..., $AP_N$ 139, and a number of client devices, such as $Client_A$ 140, ..., $Client_M$ 145, $Client_N$ 146, ..., $Client_Z$ 149, etc.

Each AP provides network services to zero or more client devices. Specifically, each AP operates on a particular wireless communication channel and communicates with its client devices on the particular wireless communication channel. For example, in FIG. 1, $AP_A$ 130 serves client devices $Client_A$ 140, ... $Client_M$ 145. A neighboring AP $AP_B$ 132 serves at least $Client_N$ 146, etc. Another neighboring AP $AP_N$ 139 serves at least $Client_Z$ 149, etc.

Note that different APs may be deployed in different physical locations with various levels of physical security access control. For example, $AP_A$ 130 may be located in a lobby where anyone can gain access to its physical proximity. By contrast, $AP_B$ 132 may be located inside office building (e.g., inside secured doors that require scanning a valid badge to access) where only corporate users and/or escorted corporate guests can gain access to its physical proximity. Moreover, $AP_N$ 139 may be located in a heightened security area (e.g., an executive briefing center that only corporate users associated with certain user roles can access).

Network controller 110 generally refers to a controlling device that manages other network devices such as wireless access points. Network controller 110 may handle automatic adjustments to radio frequency power, wireless channels, wireless authentication, and/or security.

Client devices may be associated with a corporate user or a guest user. For example, in the example illustrated in FIG. 1, $Client_A$ 140, ..., $Client_M$ 145 are associated with corporate users, whereas $Client_N$ 146, ..., $Client_Z$ 149 are associated with guest users. A network administrator may configure network policies to grant a corporate user different access to network resources than guest user. Moreover, guest users may be subject to a registration process before access to network can be granted.

Guest Access Via Dedicated AP Based on Physical Proximity

Figure 2:
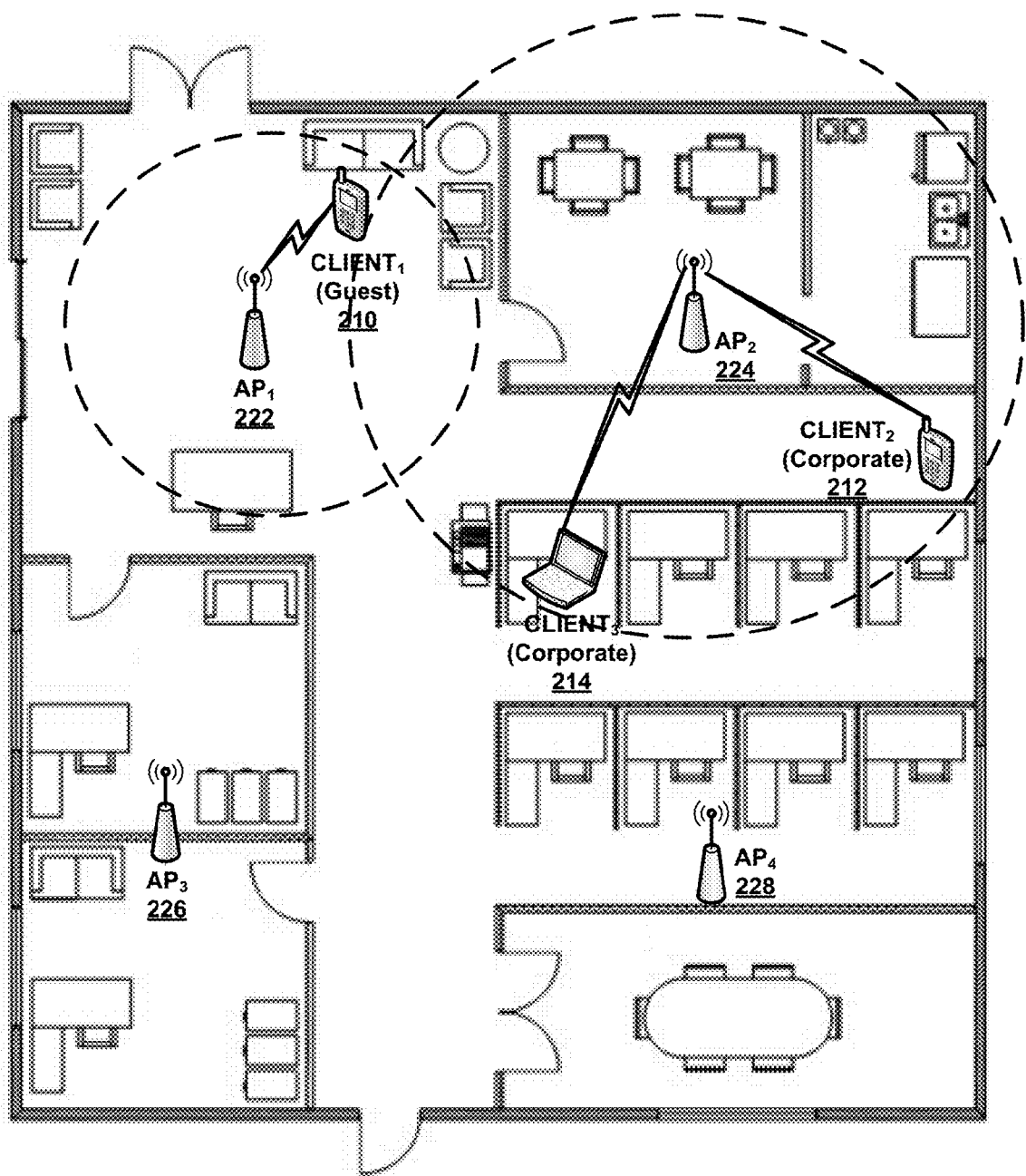
FIG. 2 shows an exemplary floorplan illustrating the deployment of a dedicated access point for providing guest WiFi authentication based on physical proximity according to embodiments of the present disclosure.

FIG. 2 shows an exemplary floorplan illustrating the deployment of a dedicated access point for providing guest Wi-Fi authentication based on physical proximity according to embodiments of the present disclosure. FIG. 2 includes a floor map of a physical environment in which a wireless network is deployed to cover the physical environment. The wireless network includes at least a plurality of client devices (such as, $Client_1$ 210, $Client_2$ 212, $Client_3$ 214) and a plurality of access points (such as, $AP_1$ 222, $AP_2$ 224, $AP_3$ 226, and $AP_4$ 228). Some client devices may be associated with guest users, e.g., $Client_1$ 210. Other client devices may be associated with corporate users, e.g., $Client_2$ 212 and $Client_3$ 214.

In some embodiments, a dedicated AP for providing guest Wi-Fi authentication, such as $AP_1$ 222, may be located in a restricted area that requires a guest user to be escorted by a corporate employee. Specifically, the transmission power of $AP_1$ 222 may be reduced and the coverage pattern of $AP_1$ 222 may be adjusted such that it only covers a specific physical area. Thus, the fact that a client device (e.g., $Client_1$ 210) associated with a guest user is located within $AP_1$ 222's limited coverage area and able to gain access to $AP_1$ 222's physical proximity suggests that the guest user is a legitimate user. Note that because $AP_1$ 222 is configured to cover only a limited physical area, an adjacent physical area (e.g., an outside lobby area) that does not require guest users to be escorted will not be covered by $AP_1$ 222's wireless signals. Thus, guest users who are not escorted will not be able to gain access to $AP_1$ 222's physical proximity.

Here, the purpose of $AP_1$ 222 is dedicated to perform guest WiFi authentication, rather than to provide good wireless network coverage. Thus, hereinafter, such an AP is also referred to as a dedicated AP to differentiate from a conventional AP in a wireless network whose purpose is to provide wireless network coverage. Because radio waves diminish significantly in accordance to the square of the distance between the sender and the receiver, the received signal strength level associated with the radio waves drops quickly as the distance between the sender and the receiver increases. When a client device (e.g., $Client_1$ 210) is located within close physical proximity to $AP_1$ 222, $AP_1$ 222 will receive wireless signals from the client device (e.g., Client1 210) at a much higher signal strength level than another client device that is located far away.

In some embodiments, $AP_1$ 222 may require a minimum threshold signal strength level (e.g., received signal strength indicator or RSSI level) associated with a wireless signal transmitted from a client device in order to grant guest WiFi access to the client device. Therefore, $AP_1$ 222 requires the client device to be located within close physical proximity, e.g., ½ to 1 meter of where $AP_1$ 222 is mounted, in order to gain guest access. It is the ability of a guest user to be located in close physical proximity to $AP_1$ 222 that indicates to the network infrastructure that the guest user is a welcomed guest of the network.

In some embodiments, if the network infrastructure identifies that a particular guest user is located inside an office building through locationing services, the guest user's location may be sufficient to grant guest WiFi access to a client device associated with the guest user. This is because the access to the office building is already controlled via another access control mechanism, e.g., a set of security doors. The premise here is that the WiFi locationing service is accurate enough to distinguish users that are located inside the office building from users that are located close to but outside the office building.

It is possible that different client devices from different manufacturing vendors may have different transmission power. Therefore, even at the same distance, $AP_1$ 222 could receive a stronger signal from a first client device than a second client device. In such cases, rather than determining an absolute signal strength level associated with a wireless signal received from a client device, the dedicated AP (e.g., $AP_1$ 222) can compare a first signal strength level associated with a first wireless signal received from the client device by the dedicated AP (e.g., $AP_1$ 222) with a second signal strength level associated with a second wireless signal received from the client device by another AP in the neighborhood. If the difference between the first signal strength level and the second signal strength level exceeds a predetermined threshold value, then the dedicated AP (e.g., $AP_1$ 222) can determine that the client device is located within its close physical proximity.

In summary, the RSSI of a wireless signal transmitted from a client device of a guest user and received by the dedicated AP must exceed a particular threshold value. The particular threshold value is calculated such that the client device from which the dedicated AP hears a signal with signal strength level greater than the particular threshold value would be located within an access-controlled area in a physical environment. In addition, the RSSI of a wireless signal received by the dedicated AP from a client device can be compared to the RSSI of another wireless signal received by a neighboring AP from the same client device, if the difference between the two RSSI values is significant, then it increases the confidence of the dedicated AP's determination that the client device is located within the close physical proximity of the dedicated AP.

Once the dedicated AP identifies that a particular client device associated with a guest user is located within an access controlled area in a physical environment, the dedicated AP can send the client device's identity to a network controller. Therefore, the network controller will be notified that the particular client device has been granted guest access to the wireless network. Accordingly, the network controller then whitelists the client device, e.g., allowing network traffic to and from the particular client device to be transmitted on the guest wireless network. Note that, here, the guest wireless network may be associated with a unique service set identifier (SSID) that is different from a corporate enterprise network, which certain authenticated employees, affiliates, partners, etc. may access but is not open for guest access.

In some embodiments, a network administrator may configure a timeout value for the guest WiFi access. Once guest WiFi access is granted by the dedicated AP to a client device, the network infrastructure will de-authenticate the client device after the period of time specified in the timeout value expires.

In some embodiments, by the same mechanism how the dedicated AP detects that a particular client device enters into a restricted area, the dedicated AP can also detect that the particular client device exits from the restricted area. Thus, if the dedicated AP detects that the particular client device, which was previously granted guest wireless network access, has exited the restricted area (e.g., being escorted out of the office building into an outside lobby area), the dedicated AP will notify the network controller to de-authenticate the particular client device from the wireless network.

In some embodiments, because some guest users may need to temporarily leave the building during a visit (e.g., to make a personal phone call) and return to the building shortly, the dedicated AP may set a timer (e.g., 10 minutes) upon detecting that the particular client device has exited the restricted area. If the dedicated AP fails to detect that the particular client device has re-entered into the restricted area within the period of time specified by the timer, the dedicated AP will notify the network controller to de-authenticate the particular client device's guest WiFi access.

In some embodiments, the dedicated AP may include a button. Instead of determining whether a client device is within close physical proximity to the dedicated AP based on signal strength level associated from a wireless signal received from the client device, the dedicated AP could require that a guest user of the client device push the button on the dedicated AP. In response to the button on the dedicated AP being pushed, the dedicated AP can start scanning for client devices located in its physical proximity. Thus, the dedicated AP does not need to be scanning its radio frequency (RF) neighborhood for wireless signals from nearby client devices all the time. It only needs to scan the RF neighborhood during a limited period of time after the button on the dedicated AP is pushed.

In some embodiments, the dedicated AP may detect other types of wireless signals than WiFi signals, such as, low-energy Bluetooth® signals, which can indicate that the sender of the signals are located within close physical proximity of the dedicated AP. In such cases, if the dedicated AP has a button, once the button is pushed, the dedicated AP will turn on additional functionalities to receive other types of wireless signals (e.g., Bluetooth® signals).

Because the technique disclosed herein requires that the client device of a guest user must be powered on and transmit at least one or more wireless signals, so that the dedicated AP and/or its neighboring APs can receive the wireless signals from the client device and evaluate their signal strength levels to determine whether the client device is located within close physical proximity to the dedicated AP. Note that, (a) if the client device is not powered on, or (b) if the client device is powered on but the WiFi capability is not enabled, or (c) if the client device is powered on and WiFi-enabled, but does not transmit any WiFi signals, the dedicated AP will not be able to receive any signals from the client device.

Therefore, to make sure that the client device will be powered on, WiFi-enabled, and transmitting WiFi signals, a captive portal page associated with the guest wireless network may provide instruction that guest users shall move their client devices within close physical proximity of the dedicated AP at a specific location in order to gain guest WiFi access to a specific SSID. Unlike conventional captive portals which prompt users to enter network credentials, the captive portal according to embodiments of the present disclosure only provides instructions for accessing the dedicated AP without any prompt for data input (e.g., registration information or consent to network use).

In a hypothetical scenario, a guest user enters a lobby of a corporate office building to visit an employee. The guest user may attempt to connect to the guest WiFi network via her laptop computer. As a result, the laptop computer's browser will display a captive portal page that states, for example, "Welcome! You may gain guest WiFi access upon entering the double glass door if you put your WiFi-enabled electronic device within three feet of a purple access point mounted on the wall next to the double glass door."

In addition, as long as the client device is accessing the dedicated AP via its browser, the dedicated AP can receive wireless signals from the client device and use those wireless signals to determine whether the client device is located within its close physical proximity.

In some embodiments, to enhance the network security, the dedicated AP may require that both the client device associated with a guest user and an authenticated client device associated with a known corporate user to be within the close physical proximity of the dedicated AP for the guest user's client device to gain guest WiFi network access. Such requirements ensure that the guest user is escorted by a legitimate corporate user. Therefore, in the example mentioned above, if the receptionist in the lobby area temporarily is not present and a guest user enters the restricted area through double glass door without any employee's escort, the client device of the guest user will not be able to gain access to the guest WiFi network even though it is located within the close physical proximity to the dedicated AP.

Process for Providing Guest WiFi Access Based on Physical Proximity

Figure 3:
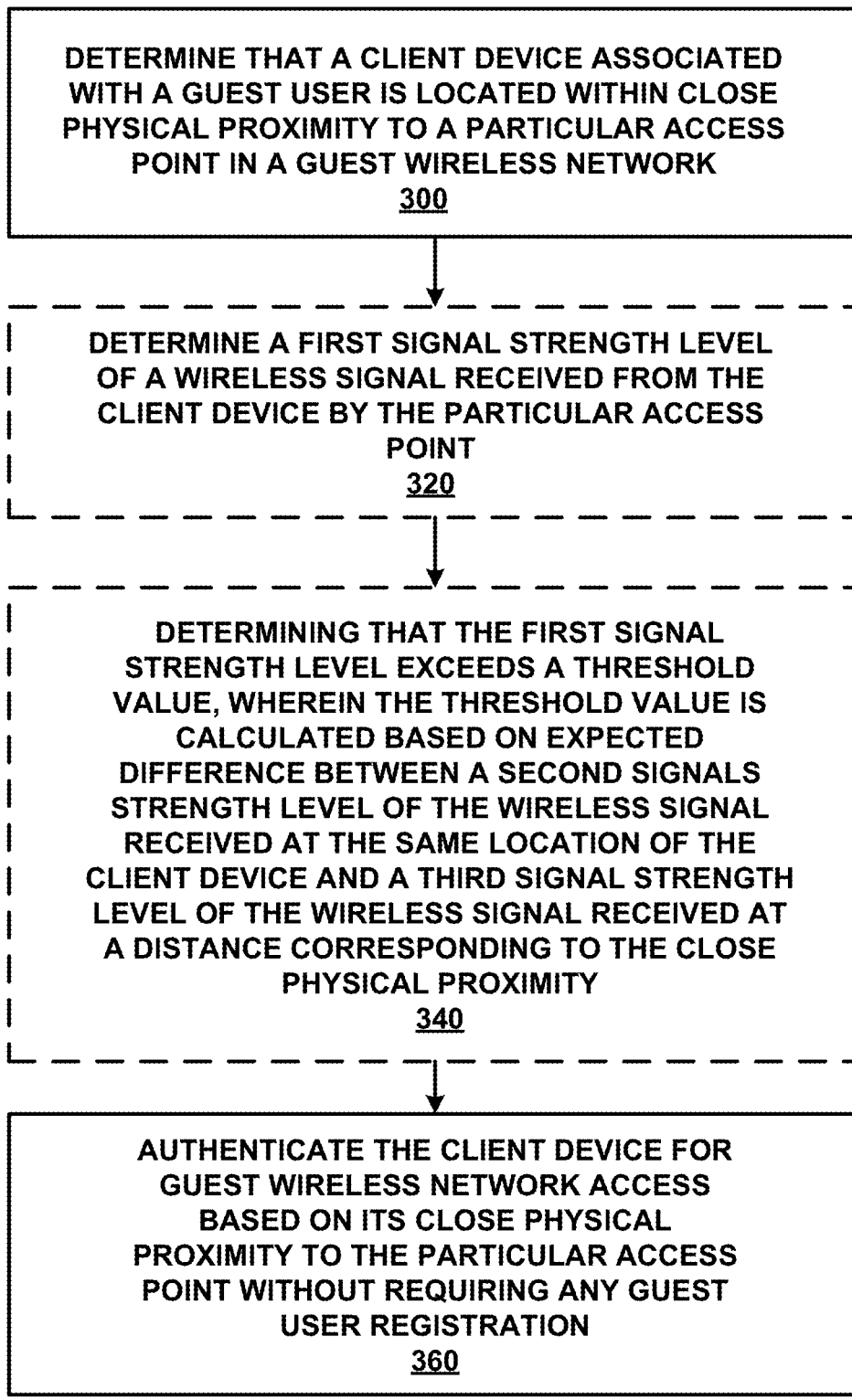
FIG. 3 illustrates an exemplary process for providing guest WiFi authentication based on physical proximity according to embodiments of the present disclosure.

FIG. 3 illustrates an exemplary process for providing guest WiFi access based on physical proximity according to embodiments of the present disclosure. During operations, a network device determines that a client device associated with a guest user is located within close physical proximity to a particular access point in a guest wireless network (operation 300). In particular, the network device may determine a first signal strength level of a wireless signal received from the client device by the particular access point (operation 320). Then, the network device may determine that the first signal strength level exceeds a threshold value (operation 340). Here, the threshold value is calculated based on expected difference between a second signal strength level of the wireless signal received at the same location of the client device and a third signal strength level of the wireless signal received at a distance corresponding to the close physical proximity. Next, the network device authenticates the client device for guest wireless network access based on its close physical proximity to the particular access point without requiring any guest user registration. In one example, the close physical proximity is no more than two meters.

In some embodiments, the network device may determine a precise location of the client device using indoor wireless locationing service, and determine that the precise location of the client device is within close physical proximity to the particular access point.

In some embodiments, the network device determines a first signal strength level of a wireless signal received from the client device by the particular access point. Then, the network device determines a second signal strength level of the wireless signal received from the client device by another access point that is located in a radio frequency neighborhood of the particular access point. Furthermore, the network device determines that the difference between the first signal strength level and the second signal strength level exceeds a threshold value.

In some embodiments, in response to authenticating the client device for guest wireless network access, the network device transmits a notification message to a network control device indicating that the client device has been authenticated to the guest wireless network.

In some embodiments, the network device de-authenticates the client device from the guest wireless network after a predetermined period of time elapses.

In some embodiments, the network device determines both (1) that the client device has been authenticated to access the guest wireless network and (2) that the client device is located within close physical proximity to the particular access point. Then, the network device de-authenticates the client device from the guest wireless network.

In some embodiments, in response to determining both (1) that the client device has been authenticated to access the guest wireless network and (2) that the client device is located within close physical proximity to the particular access point, the network device stores a timestamp that indicates when the client device exits an authentication zone. Further, the network device determines that the client device is not located within close physical proximity to the particular access point within a predetermined period of time, and proceeds to de-authenticate the client device from the guest wireless network after the predetermined period of time elapses.

In some embodiments, the particular access point includes a button. The network device can detect that the button is activated. In response, the network device scans for a plurality of wireless signals transmitted by a plurality of client devices located near the particular access point. Also, the network device determines a subset of the plurality of client devices based on whether a signal strength value associated with a respective client device exceeds a threshold value. Then, the network device will authenticate the subset of client devices for guest wireless network access without requiring any guest user registration.

In some embodiments, the network device transmits a captive portal page to the client device that displays instructions to the guest user to (1) move the client device within the close physical proximity to the particular access point; and (2) enable WiFi capabilities on the client device, wherein the captive portal page does not include any prompt for information input by the guest user.

System for Providing Guest WiFi Access Based on Physical Proximity

Figure 4:
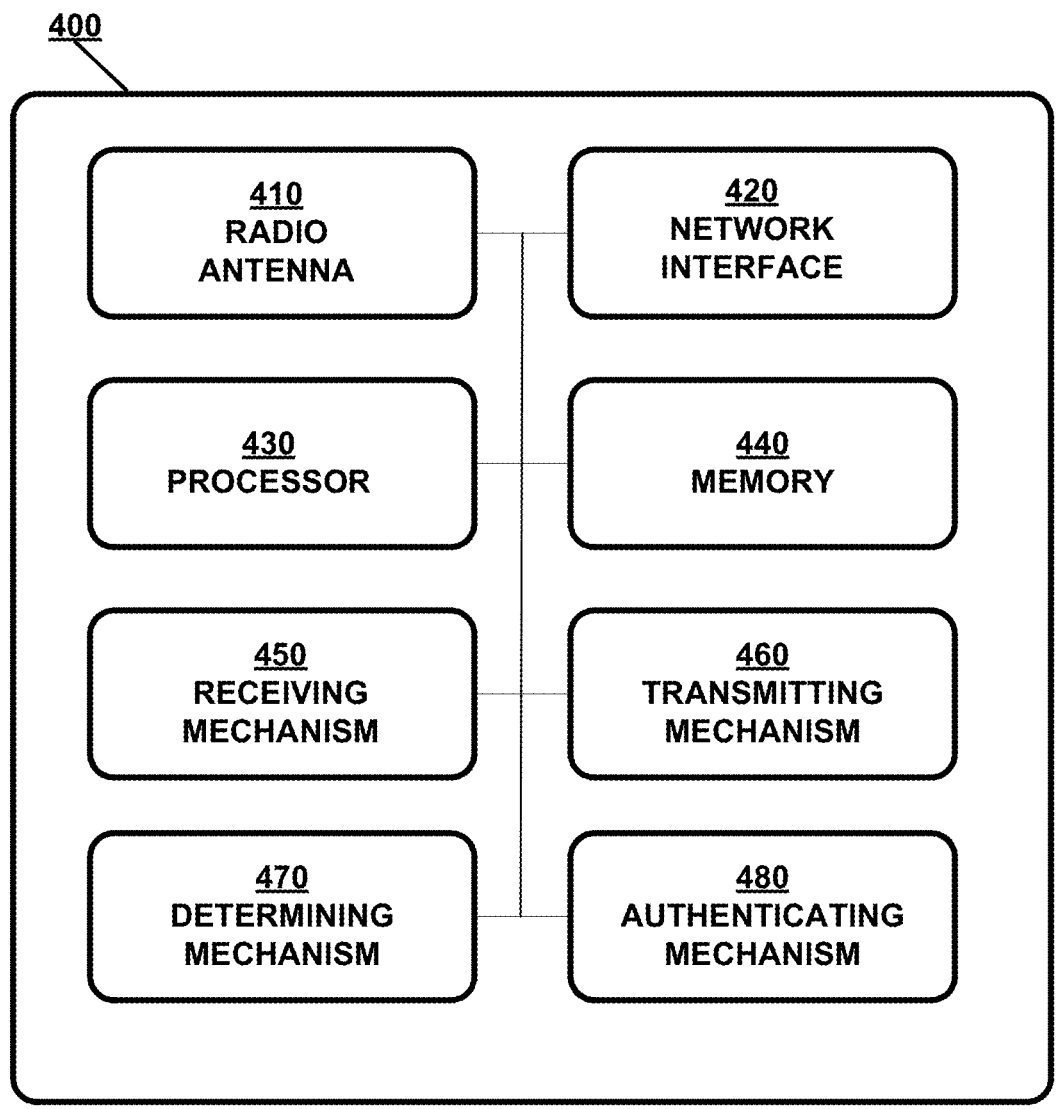
FIG. 4 is a block diagram illustrating an exemplary system for providing guest WiFi authentication based on physical proximity according to embodiments of the present disclosure.

FIG. 4 is a block diagram illustrating an exemplary system for providing guest WiFi access based on physical proximity according to embodiments of the present disclosure. Network device 400 includes at least one or more radio antennas 410 capable of either transmitting or receiving radio signals or both, a network interface 420 capable of communicating to a wired or wireless network, a processor 430 capable of processing computing instructions, and a memory 440 capable of storing instructions and data. Moreover, network device 400 further includes a receiving mechanism 450, a transmitting mechanism 460, a determining mechanism 470, and an authenticating mechanism 480, all of which are in communication with processor 430 and/or memory 440 in network device 400. Network device 400 may be used as a client system, or a server system, or may serve both as a client and a server in a distributed or a cloud computing environment.

Radio antenna 410 may be any combination of known or conventional electrical components for receipt of signaling, including but not limited to, transistors, capacitors, resistors, multiplexers, wiring, registers, diodes or any other electrical components known or later become known.

Network interface 420 can be any communication interface, which includes but is not limited to, a modem, token ring interface, Ethernet interface, wireless IEEE 802.11 interface, cellular wireless interface, satellite transmission interface, or any other interface for coupling network devices.

Processor 430 can include one or more microprocessors and/or network processors. Memory 440 can include storage components, such as, Dynamic Random Access Memory (DRAM), Static Random Access Memory (SRAM), etc. In particular, in response to determining mechanism 470 determining both (1) that the client device has been authenticated to access the guest wireless network and (2) that the client device is located within close physical proximity to the particular access point, memory 440 will store a timestamp that indicates when the client device exists an authentication zone.

Receiving mechanism 450 generally receives one or more network messages via network interface 420 or radio antenna 410 from a wireless client. The received network messages may include, but are not limited to, requests and/or responses, beacon frames, management frames, control path frames, and so on.

Transmitting mechanism 460 generally transmits messages, which include, but are not limited to, requests and/or responses, beacon frames, management frames, control path frames, and so on. Specifically, in response to authenticating mechanism 480 authenticating the client device for guest wireless network access, transmitting mechanism 460 can transmit a notification message to a network control device indicating that the client device has been authenticated to the guest wireless network.

In some embodiments, transmitting mechanism 460 also transmits a captive portal page to the client device that displays instructions to the guest user to (1) move the client device within the close physical proximity to the particular access point; and (2) enable WiFi capabilities on the client device. Note that the captive portal page does not include any prompt for information input by the guest user.

Determining mechanism 470 generally determines that a client device associated with a guest user is located within close physical proximity to a particular access point in a guest wireless network. The close physical proximity may be defined as being no more than two meters from the particular access point.

In some embodiments, determining mechanism 470 determines a precise location of the client device using indoor wireless locationing service, and also determines that the precise location of the client device is within close physical proximity to the particular access point.

In some embodiments, determining mechanism 470 determines a first signal strength level of a wireless signal received from the client device by the particular access point. Then, determining mechanism 470 determines that the first signal strength level exceeds a threshold value. In particular, the threshold value is calculated based on expected difference between a second signals strength level of the wireless signal received at the same location of the client device and a third signal strength level of the wireless signal received at a distance corresponding to the close physical proximity.

In some embodiments, determining mechanism 470 determines a first signal strength level of a wireless signal received from the client device by the particular access point. Moreover, determining mechanism 470 determines a second signal strength level of the wireless signal received from the client device by another access point that is located in a radio frequency neighborhood of the particular access point. Next, determining mechanism 470 determines that the difference between the first signal strength level and the second signal strength level exceeds a threshold value.

In some embodiments, determining mechanism 470 determines both (1) that the client device has been authenticated to access the guest wireless network and (2) that the client device is located within close physical proximity to the particular access point. Also, determining mechanism 470 may determine that the client device is not located within close physical proximity to the particular access point within a predetermined period of time.

In some embodiments, the particular access point can include a button. Determining mechanism 470 can further detect that the button is activated, and scan for a plurality of wireless signals transmitted by a plurality of client devices located near the particular access point. Then, determining mechanism 470 determines a subset of the plurality of client devices based on whether a signal strength value associated with a respective client device exceeds a threshold value.

Authenticating mechanism 480 generally authenticates and/or de-authenticates a client device of a guest user for guest wireless network access. Specifically, authenticating mechanism 480 can authenticate the client device for guest wireless network access based on its close physical proximity to the particular access point without requiring any guest user registration. In some embodiments, authenticating mechanism 480 authenticates a subset of client devices for guest wireless network access at the same time.

Also, authenticating mechanism 480 can de-authenticate a client device from the guest wireless network. In some embodiments, authenticating mechanism 480 de-authenticates the client device from the guest wireless network after a predetermined period of time elapses.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by one or more hardware processors, causes performance of operations comprising:
determining that a client device associated with a guest user is located within close physical proximity to a particular access point in a guest wireless network; and
authenticating the client device for guest wireless network access based on its close physical proximity to the particular access point without requiring any guest user registration,
wherein determining that the client device is located within close physical proximity to the particular access point comprises:
determining a first signal strength level of a wireless signal received from the client device by the particular access point;
determining a second signal strength level of the wireless signal received from the client device by another access point that is located in a radio frequency neighborhood of the particular access point;
determining that the difference between the first signal strength level and the second signal strength level exceeds a threshold value.

2. The medium of claim 1, wherein determining that the client device is located within close physical proximity to the particular access point comprises:
determining a precise location of the client device using indoor wireless locationing service; and
determining that the precise location of the client device is within close physical proximity to the particular access point.

3. The medium of claim 1, further comprising:
in response to authenticating the client device for guest wireless network access, transmitting a notification message to a network control device indicating that the client device has been authenticated to the guest wireless network.

4. The medium of claim 1, further comprising:
de-authenticating the client device from the guest wireless network after a predetermined period of time elapses.

5. The medium of claim 1, further comprising:
determining both (1) that the client device has been authenticated to access the guest wireless network and (2) that the client device is located within close physical proximity to the particular access point;
de-authenticating the client device from the guest wireless network.

6. The medium of claim 5, further comprising:
in response to determining both (1) that the client device has been authenticated to access the guest wireless network and (2) that the client device is located within close physical proximity to the particular access point, storing a timestamp that indicates when the client device exits an authentication zone;
determining that the client device is not located within close physical proximity to the particular access point within a predetermined period of time; and
de-authenticating the client device from the guest wireless network after the predetermined period of time elapses.

7. The medium of claim 1, wherein the particular access point comprises a button, wherein the operations further comprise:
detecting that the button is activated;
scanning for a plurality of wireless signals transmitted by a plurality of client devices located near the particular access point;
determining a subset of the plurality of client devices based on whether a signal strength value associated with a respective client device exceeds a threshold value; and
authenticating the subset of client devices for guest wireless network access without requiring any guest user registration.

8. The medium of claim 1, further comprising:
transmitting a captive portal page to the client device that displays instructions to the guest user to (1) move the client device within the close physical proximity to the particular access point; and (2) enable WiFi capabilities on the client device, wherein the captive portal page does not include any prompt for information input by the guest user.

9. A system comprising:
at least one device including a hardware processor;
the system being configured to perform operations comprising:
determining that a client device associated with a guest user is located within close physical proximity to a particular access point in a guest wireless network; and
authenticating the client device for guest wireless network access based on its close physical proximity to the particular access point without requiring any guest user registration,
wherein determining that the client device is located within close physical proximity to the particular access point comprises:
determining a first signal strength level of a wireless signal received from the client device by the particular access point;
determining a second signal strength level of the wireless signal received from the client device by another access joint that is located in a radio frequency neighborhood of the particular access point;
determining that the difference between the first signal strength level and the second signal strength level exceeds a threshold value.

10. The system of claim 9, wherein determining that the client device is located within close physical proximity to the particular access point comprises:
determining a precise location of the client device using indoor wireless locationing service; and
determining that the precise location of the client device is within close physical proximity to the particular access point.

11. The system of claim 9, further comprising:
in response to authenticating the client device for guest wireless network access, transmitting a notification message to a network control device indicating that the client device has been authenticated to the guest wireless network.

12. The system of claim 9, further comprising:
de-authenticating the client device from the guest wireless network after a predetermined period of time elapses.

13. The system of claim 9, further comprising:
determining both (1) that the client device has been authenticated to access the guest wireless network and (2) that the client device is located within close physical proximity to the particular access point;
de-authenticating the client device from the guest wireless network.

14. The system of claim 13, further comprising:
in response to determining both (1) that the client device has been authenticated to access the guest wireless network and (2) that the client device is located within close physical proximity to the particular access point, storing a timestamp that indicates when the client device exits an authentication zone;

determining that the client device is not located within close physical proximity to the particular access point within a predetermined period of time; and de-authenticating the client device from the guest wireless network after the predetermined period of time elapses.

15. The system of claim 9, wherein the particular access point comprises a button, wherein the operations further comprise:

detecting that the button is activated;

scanning for a plurality of wireless signals transmitted by a plurality of client devices located near the particular access point;

determining a subset of the plurality of client devices based on whether a signal strength value associated with a respective client device exceeds a threshold value; and authenticating the subset of client devices for guest wireless network access without requiring any guest user registration.

16. The system of claim 9, further comprising:

transmitting a captive portal page to the client device that displays instructions to the guest user to (1) move the client device within the close physical proximity to the particular access point; and (2) enable Win capabilities on the client device, wherein the captive portal page does not include any prompt for information input by the guest user.

17. A non-transitory computer readable medium comprising instructions which, when executed by one or more hardware processors, causes performance of operations comprising:

determining that a client device associated with a guest user is located within close physical proximity to a particular access point in a guest wireless network; and authenticating the client device for guest wireless network access based on its close physical proximity to the particular access point without requiring any guest user registration, wherein determining that the client device is located within close physical proximity to the particular access point comprises:

determining a first signal strength level of a wireless signal received from the client device by the particular access point; and determining that the first signal strength level exceeds a threshold value, wherein the threshold value is calculated based on expected difference between a second signal strength level of the wireless signal received at the same location of the client device and a third signal strength level of the wireless signal received at a distance corresponding to the close physical proximity.

* * * * *